July 18, 1967

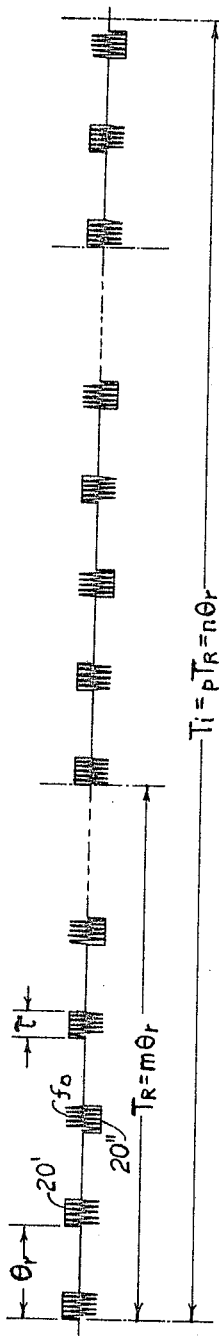
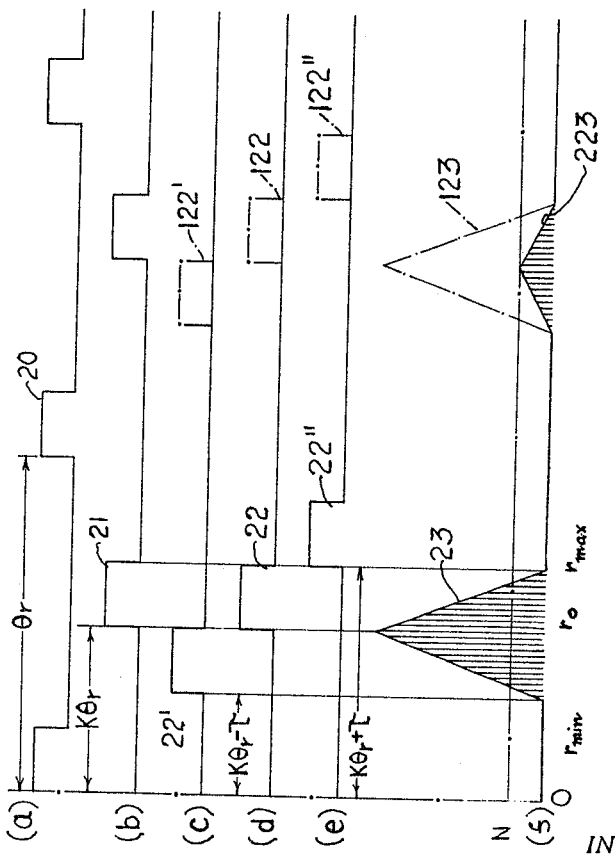

G. NARD ETAL 3,332,077

AIRBORNE TRIGGERING SYSTEM FOR PROXIMITY FUSE OR THE LIKE

Filed Dec. 16, 1965

INVENTORS:
GEORGES NARD
ROGER PAGAZANI
MARCEL PALAZO.

BY Karl J. Ross
ATTORNEY.

3,332,077
AIRBORNE TRIGGERING SYSTEM FOR PROXIMITY FUSE OR THE LIKE

Georges Nard, Clamart, Roger Pagazani, Fontenay-aux-Roses, and Marcel Palazo, Bourg-la-Reine, France, assignors to Compagnie Francaise Thomson-Houston-Hotchkiss Brandt, a corporation of France
Filed Dec. 16, 1965, Ser. No. 514,187
Claims priority, application France, Dec. 17, 1964, 999,035, Patent 1,442,324
10 Claims. (Cl. 343—7)

ABSTRACT OF THE DISCLOSURE

Airborne system for the triggering of a proximity fuse or the like wherein equispaced pulses of radar frequency are randomly inverted in phase prior to transmission; upon the transmission of each outgoing pulse, after a predetermined delay corresponding to a desired range of a reflecting target, the phase of this outgoing pulse is compared with that of an echo pulse then arriving and, in the case of a proper match, an output is generated. The integrated value of that output over a large number of pulses has an appreciable magnitude only if the incoming pulses are due to reflections from a target within range.

---

Our present invention relates to an airborne triggering system responsive to echoes of high-frequency electromagnetic waves which are reflected from a target as the latter is approached by a missile or other vehicle equipped with that system.

Such radar-type triggering systems have their principal utility in so-called proximity fuses used for the destruction of military targets, the signal produced by the triggering circuit serving to set off an explosive charge aboard the missile as the latter flies past the object to be attacked. It should be noted, however, that such systems can also be utilized for industrial or scientific purposes, e.g. by triggering a camera shutter or sending back a monitoring signal upon passing close to the designated object.

Conventional triggering systems for radar-controlled proximity fuses and the like fall into two general classes, i.e. those operating with continuous-wave transmission and those relying on a train of discrete pulses of extremely short duration (e.g. of 20 to 30 nanoseconds). With continuous-wave transmission it is possible to ascertain the point of closest approach to a reflecting object by comparing the frequency of the incoming echoes with that of the outgoing waves, this difference being due to the Doppler shift caused by a radial component of the relative speed of the missile and the object, and detonating the charge at the instant when the Doppler shift goes to zero. This technique has the drawback of producing a triggering signal in response to reflections from objects of indeterminate distance from the missile so that the charge may be detonated ineffectually as the vehicle moves past a strong but distant reflector. Alternatively, the outgoing radar wave may be progressively modulated in frequency so as to provide a measure of distance upon a comparison of the frequencies of the transmitted and received waves. In this case, however, ambiguities arise from the possibility that echoes from distant objects, arriving with a delay which exceeds the repetition period of the frequency-modulation pattern, may give rise to a spurious proximity signal at a subsequent cycle of modulation; furthermore, the frequency change due to distance is indistinguishable from that caused by a possible Doppler shift so that a more distant object moving at the proper radial speed may simulate a closer stationary target and may thus cause misfiring. With emission of discrete pulses, on the other hand, the same ambiguity as to distance exists as with a progressively frequency-modulated continuous wave; this ambiguity can be minimized only by a very wide pulse spacing which, however, would require a transmitter of large peak power in order that the mean value of the transmitted wave energy should be high enough above the noise level to insure satisfactory reception, such high-power transmitter being cumbersome and difficult to install on airborne vehicles.

It is, therefore, the general object of our present invention to provide a radar-controlled triggering system of the general character referred to which is free from the disadvantages set forth above and which, with a moderate expenditure of energy, will accurately pinpoint a target preparatorily to generating an output signal designed to trigger a charge detonator or to initiate some other desired operation.

A more particular object of this invention is to provide a system responsive only, with a very high degree of probability, to reflections from a nearby target which is substantially free from a relative radial motion of its own (as seen from the approaching vehicle), and which is located within a predetermined range of distances from the vehicle as well as within a narrow angular sector centered upon a direction substantially perpendicular to the flight path of the vehicle.

A further object of the invention is to provide a system of this type which effectively discriminates against broad-surface reflectors, such as the soil or the sea, whose echoes might otherwise set off an explosive charge aboard a vehicle descending toward such reflecting surface.

It is also an object of the present invention to provide an airborne radar system for the purpose described which utilizes only a single antenna, or antenna array, for both transmission and reception without objectionable cross-coupling between the two branches of the system.

Another object is the provision of a pulse-type radar system capable of operating with a large ratio of pulse width to pulse-recurrence period, hereinafter referred to as the duty cycle, without introducing objectionable ambiguity as to distance.

Still another object is to provide a triggering system capable of effectively discriminating against echoes from out-of-range reflectors which, especially in the case of a military target, may have been deliberately placed there by the defenders for purposes of interference or decoy.

The system according to our invention comprises a pulse-type radar transmitter connected to a source of equispaced pulses which constitute bursts of a high-frequency carrier oscillation of constant frequency, these pulses differing from those of conventional radar systems by random variation in the phase of their carrier relative to an unmodulated reference wave of like frequency throughout a train of such pulses whose duration is large compared with the recurrence period of the pulses. The phase variation, which in a preferred embodiment consists simply of shifts of 0° during certain pulses and 180° during other pulses, produces a characteristic pattern which repeats itself, if at all, only at very long intervals and thus effectively excludes any ambiguity as to the distance of the reflecting object. With the aid of an interposed range gate, controlled by the pulse source via a delay circuit whose delay time corresponds to the desired mean target distance, the incoming echo pulses are screened so that only those arriving with the predetermined delay are allowed to pass. The echoes so passed are then compared in phase with the immediately preceding outgoing pulse and, if improperly matched, indicate that they were not due to such outgoing pulse and that they are therefore the result of an earlier pulse of a more distant object. In the case of a target within range, all the echo pulses received throughout an extended test interval will have the correct phase relationship and, upon being correlated with a train of reference pulses serving for the selective gating of these echo pulses in accordance with the phases of the previously transmitted outgoing pulses, will generate an output whose integrated value eventually reaches a magnitude sufficient to trigger an associated load circuit as determined by a suitably preset threshold device in that circuit. With imperfect correlation, i.e. with a significant part of the incoming echo pulses lacking the correct phase relationship, the threshold will not be reached.

It should be noted here that the phase of a reflected burst of electromagnetic radiation at the high frequencies here contemplated (e.g. on the order of 10 gigacycles per second) varies rapidly with very small changes in target distance and that its absolute value is of no significance in locating the target. As the craft approaches the target, the properly phase-matched echo pulses will be at certain times in aiding and at other times in opposing phase relationship with the immediately preceding outgoing pulses as marked by the respective reference pulses. Thus, the output of the correlator will be a train of discrete video spikes of rhythmically varying amplitude and/or polarity. These periodical variations at a relatively low frequency depend upon the speed of the approach and, therefore, correspond ot the Doppler shift which the high-frequency carrier experiences at that moment. As the craft moves past the target, this Doppler shift progressively decreases and finally vanishes at the instant when the line extending from the radar system to the target is perpendicular to the flight path of the vehicle. By passing the fluctuating output of the correlator through a low-pass filter, which eliminated all signals due to the larger Doppler shifts, we can restrict the operative zone of the system to a limited sector extending over, say, only one or two degrees on either side of the perpendicular to the flight path. This Doppler filter will also discriminate against reflecting objects whose own velocity increases the Doppler frequency to a value higher than the cut-off frequency of the filter, thereby effectively constituting a velocity gate supplementing the aforementioned range gate. As will be shown hereinafter, the same velocity discrimination is effective against reflections from the ground which may be due to secondary lobes of the outgoing radar beam whose main lobe, advantageously, is restricted to the angular sector delimited by the Doppler filter.

When the phase of the incoming echo pulses does not match that of the respectively preceding outgoing pulses compared therewith via the corresponding reference pulses, the output of the correlator will be a succession of erratic noises with no distinguishable fundamental frequency whose coherent integration, e.g. as performed by the aforedescribed Doppler filter, will not lead to a useful signal. With coherent integration over a period $T_1 = n\theta_r$, where $\theta_r$ is the recurrence period of the transmitted pulses, the signal-to-noise ratio will be $\sqrt{n}:1$.

The relationship just described permits the use of a phase shifter whose random operation constitutes a repetitive pattern with a repetition period $T_R = m\theta_r$ where $m \gg 1$; such repetitive phase pattern is in practice more convenient than a radom pattern of unlimited diversification. If the integration period $T_i = n\theta_r$ equals $pT_R$ where $p = n/m$ is greater than unity, the integrated value of the noise will be $\sqrt{p}$ times that of the aforedescribed situation with a nonrepetitive pattern. Thus, if a good signal-to-noise ratio is to be maintained, $p\sqrt{m} = \sqrt{pn}$ should be substantially smaller than $n$ whence $p \ll n$. It is also desirable that the integration interval $T_i$ should not be an exact multiple of the repetition period $T_R$, i.e. that $p$ should not be an integer, in order to reduce the degree of noise correlation. Thus, $p$ advantageously ranges between a lower limit greater than 2 and an upper limit of about $\sqrt{n}$. Naturally, the repetition period $T_R = T_i/p$ should in any event be long enough to insure that echo pulses delayed over this period are sufficiently attenuated to prevent false operation of the triggering system.

The interval $T_i$ of coherent integration coresponds to the reciprocal of the bandwidth of the Doppler filter if the latter is used as the integrator. If this Doppler filter has a cut-off frequency $\Delta F_d$ determined by the boundary ray of the principal lobe of the radar beam which includes an angle $\alpha$ with the perpendicular to the flight path, the interval $T_i$ is given by the formula $$T_i \approx \frac{c}{2f_0 v \alpha} \quad (1)$$

where $f_0$ is the carrier frequency, $c$ is the speed of wave propagation and $v$ is the velocity of the craft. This duration $T_i$ should not be greater than the total time $T_t$ during which the target is illuminated by the beam, the latter period being given by the formula $$T_t \approx \frac{2d\alpha}{v} \quad (2)$$

where $d$ is the target distance. In many cases, $T_t$ will be substantially greater than $T_i$ and, for more effective utilization of the reflected wave energy, we then prefer to integrate the output signal of the Doppler filter noncoherently throughout the longer period $T_t$.

The width $\tau$ of any transmitted pulse, preferably representing a relatively large fraction of the recurrence period $\theta_r$, determines the depth of a zone, centered on a selected mean radius $r_0$, within which a target must be located in order to trigger a response. Thus, if the range gate is periodically unblocked by a gating pulse having the same width $\tau$ as the incoming echo pulse, all or part of the latter will pass this gate if the transit time to and from the target has the value $t = t_0 \pm \tau$ where $t_0 = 2r_0/c$ represents the delay time $k\theta_r$ with $k < 1$. In order to exclude any possibility of direct transmission of outgoing pulses to the receiving circuit, the effective gating interval $2\tau$, augmented by the pulse width $\tau$ should be well within the off-period $\theta_r - \tau$ of the gating circuit, whence $\theta_r > 4\tau$. This condition can be satisfied with $k \approx 0.5$ in pulse trains wherein the recurrence period $\theta_r$ is on the order of 5 times the pulse width $\tau$ which affords a large duty cycle in comparison with conventional pulse-type radar systems. The increased pulse density enables a more rational utilization of the available electric power of the transmitter.

The aforestated and other features of our invention will be better understood from the following detailed description of a preferred embodiment, reference being made to the accompanying drawing in which:

FIGS. 6, 7, 8 and 9 are explanatory wave diagrams; and

Figure 1:
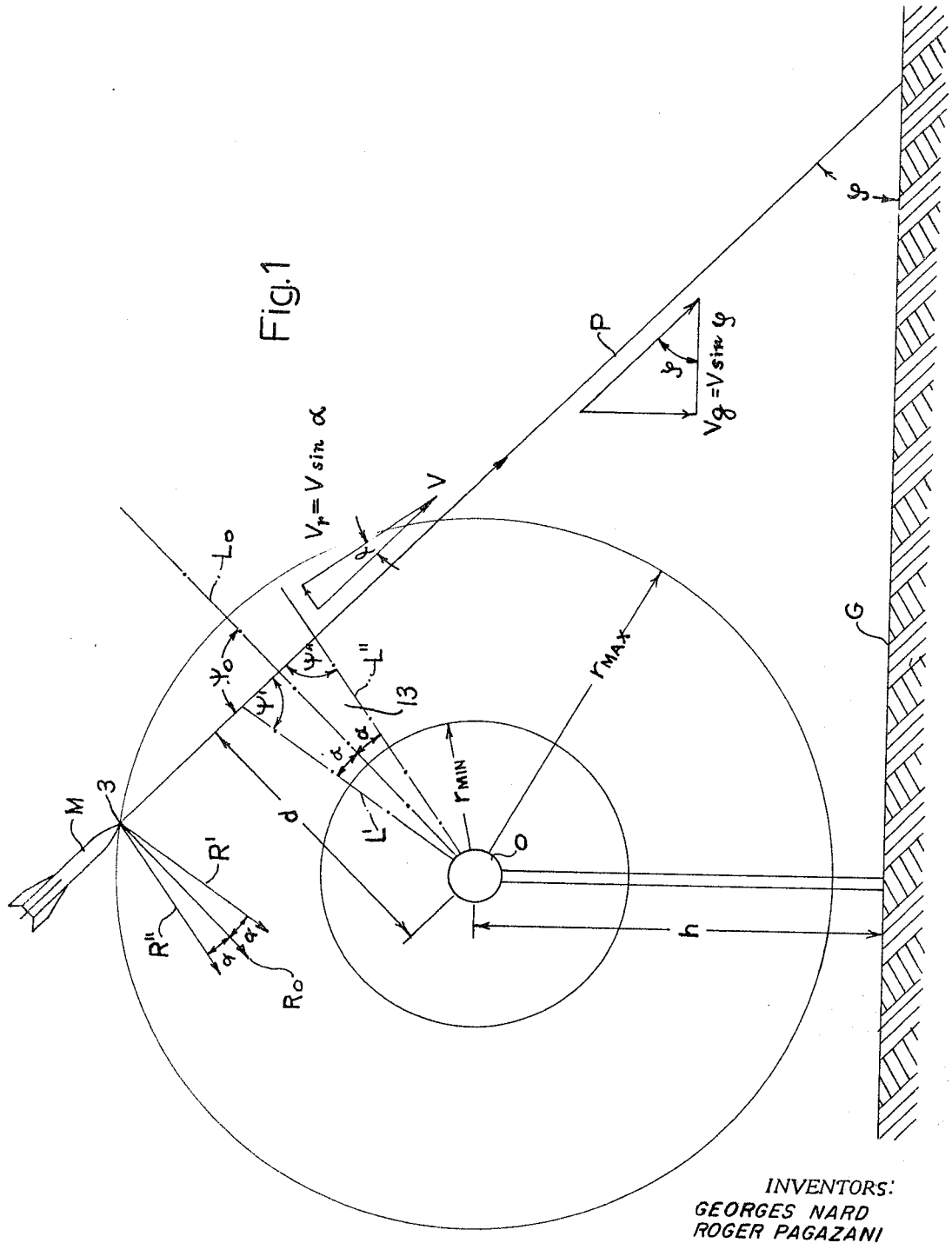
FIG. 1 is a diagrammatic elevational view of a missile, equipped with a system according to the invention, approaching a target to be destroyed.
Figure 2:
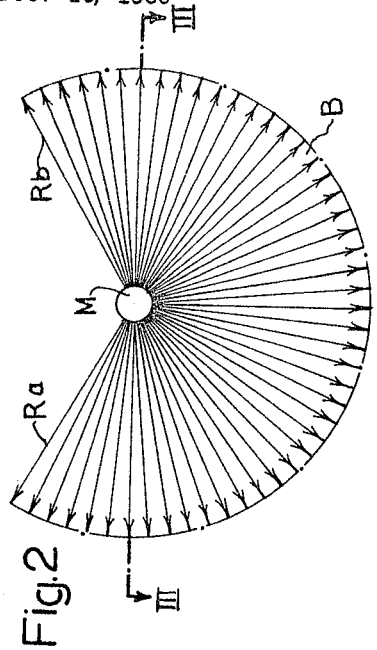
FIG. 2 is a diagrammatic end view of the missile, showing its transverse radiation pattern.

Reference will first be made to FIG. 1 where we have shown a missile M on a flight path P which descends toward the ground G at a velocity $v$ and at an angle of inclination $\varphi$ (here about 45°) with reference to the horizontal. The missile M, as more clearly illustrated in FIGS. 2 and 3, carries an antenna (or antenna array) 3 which emits a beam of high-frequency radiation whose main lobe B has a sector-shaped pattern extending over an arc of approximately 240° around the missile axis; thus, the limiting rays $R_a$ and $R_b$ of this lobe include each an angle of substantially 60° with the vertical, the missile being stabilized against roll to maintain this position. In an axial plane the boundaries of the principal lobe B of the beam are rays R' and R" including angles of $\pm \alpha$ with a center ray $R_0$ which extends at right angles to the missile axis; the angle $\alpha$ may equal only a few degrees.

Figure 4:
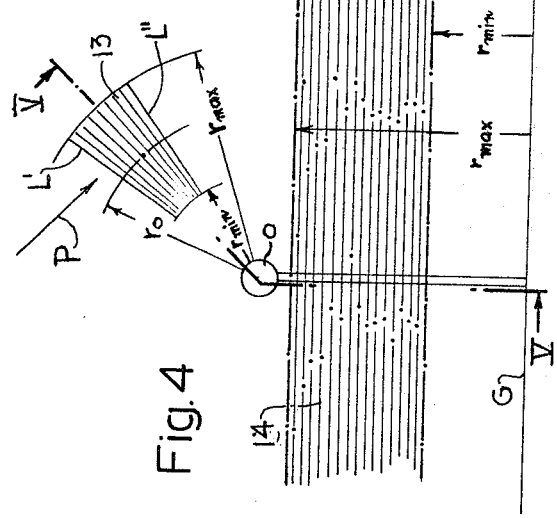
FIG. 4 is another diagrammatic view showing, in sectional elevation, the zone of detonation associated with the target as determined by the inclination of the flight path of the missile.

FIG. 1 also shows an object O fixedly located above the ground at a height $h$ slightly greater than the distance $d$ that separates the object O from the flight path P. It is assumed that the object O is a target to be attacked by the missile and that the distance $d$ is less than the maximum range $r_{max}$ but greater than minimum range $r_{min}$ defining the limits of effectiveness of an explosive charge carried aboard the missile. A line $L_0$, extending from target O perpendicularly to path P, is flanked by the boundaries L', L" of an imaginary zone 13 (see also FIGS. 4 and 5) which is further bounded by the limiting radii $r_{min}$ and $r_{max}$ and which represents the region within which any missile descending at the angle $\varphi$ can be effectively fired. Boundary line L', parallel to ray R', and boundary line L", parallel to ray R", include the aforementioned angle $\alpha$ with the perpendicular $L_0$. At $\psi_0$, $\psi'$, $\psi''$ we have indicated the angles included by the lines $L_0$, L', L" with path P, $\psi_0$ being equal to 90° and $\psi'$, $\psi''$ being the complement of $\alpha$.

The carrier frequency of the radiant energy transmitted from the missile M and reflected back to it along either of its limiting rays R', R" experiences a Doppler shift $\Delta F_d$ due to a radical velocity component $v_r = v \sin \alpha$, this velocity component decreasing toward the center of the beam and going to zero along the ray $R_0$. The frequency shift $\Delta F_d$ has the velocity $$\Delta F_d = \frac{2f_0 v \sin \alpha}{c} \quad (3)$$

which, for small values of $\alpha$, may be written as $$\Delta F_d \approx \frac{2f_0 v \alpha}{c} \quad (3a)$$

This limiting value of the Doppler frequency $\Delta F_d$ is small compared to the Doppler frequency $F_{dg}$ due to the vertical component $v_g = v \sin \varphi$ which characterizes echoes from either the primary lobe B or secondary lobes of the beam pattern reflected by the ground G.

By means of a suitable Doppler filter aboard the craft M, as more fully described hereinafter, echoes with Doppler shifts greater than $\Delta F_d$ are suppressed so that reflections from the ground G will not be effective to set off the charge as long as $\varphi > \alpha$. Thus we have indicated in FIG. 4 a horizontal zone 14 within which the missile would fire, if not previously detonated by its approach to the target O, if the velocity gate represented by this Doppler filter were not provided. Owing to the presence of this gate the missile will be prevented from ineffectually exploding within the zone 14 and may be usefully detonated at a later time, e.g. upon impact with the ground, to destroy a secondary target.

Figure 5:
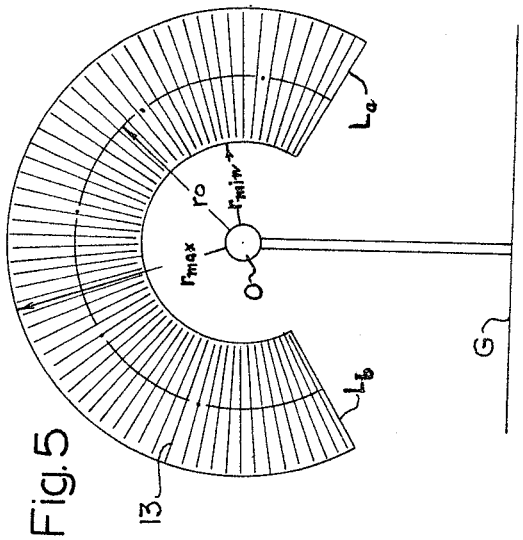
FIG. 5 is a sectional view of the detonation zone taken on the line V—V of FIG. 4.

As will be noted from FIG. 5, the detonation zone 13 surrounding the target O is bounded by lines $L_a$, $L_b$ which are parallel to the rays $R_a$, $R_b$ of the beam B and which thus also define a sector extending over an arc of approximately 240°. The missile M is not expected to pass underneath the target O, which may be, for example, a radar antenna atop a mast, within the sector of 120° bounded by the lines $L_a$ and $L_b$; if, however, the missile enters the volume 13 at any point above, beside or somewhat below the target, the probability of detonation will be very high (e.g. 60 to 99%).

Figure 3:
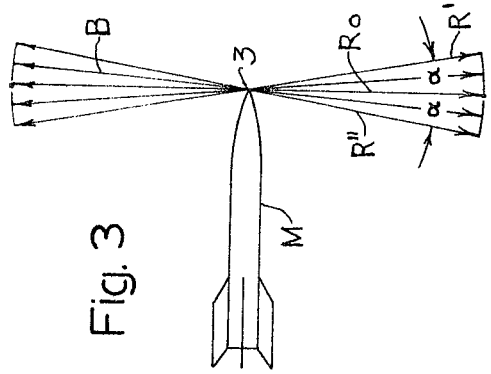
FIG. 3 is a cross-sectional view of the radiation pattern taken on the line III—III of FIG. 2.

In FIG. 6 we have illustrated a train of equispaced pulses 20', 20" transmitted by the antenna 3 of FIG. 3, these pulses taking the form of rectangular bursts of a high-frequency oscillation $f_0$ having a width $\tau$ and a recurrence period $\theta_r$ approximately equal to $5\tau$. The pulses 20' and 20" differ from each other by a relative phase inversion of their carrier $f_0$; this has been indicated diagrammatically in FIG. 6 by a heavy outline which frames either the positive or the negative half-cycles of the carrier wave. The random pattern of pulses 20' and 20", extending over a large number $m$ of cycles, is repeated after a period $T_R = m\theta_r$ recurring several times within an integration interval $T_i = pT_R = n\theta_r$. As has been explained before, the number $p$ of repetition periods $T_R$ within interval $T_i$ should be small compared with $n$ and preferably less than $\sqrt{n}$; in a specific embodiment, $n$ may be approximately 3000 and $p$, as shown, may be a fraction larger than 2.

When the pulse train 20', 20" transmitted by antenna 3 is reflected by an extraneous object such as the target O, the echo pulses return to the aerial with a delay $k\theta_r = 2d/c$ where $d$, as before, is the distance between the target and the craft M. FIG. 7 shows in graph (a) a train of outgoing pulses 20 of the type described in connection with FIG. 6, and in graph (b) a train of identically spaced and proportioned gating pulses 21 lagging the pulses 20 by the requisite delay $k\theta_r$. An echo pulse 22', reflected from an object at the proximal boundary $r_{min}$ of space 13 (FIGS. 4 and 5), has a delay equal to $k\theta_r - \tau$ as indicated in graph (c) of FIG. 7; an echo pulse 22 from the center region $r_0$ of zone 13 is precisely aligned with gate pulse 21 as shown in graph (d), whereas an echo pulse 22" from just beyond the outer boundary $r_{max}$ of the zone has the delay $k\theta_r + \tau$ indicated in graph (e). Thus, as illustrated in graph (f), the output of a pulse gate periodically opened by the pulses 21 of graph (b) will vary along a triangular outline 23 having a base of width $2\tau$, corresponding to the distance $r_{max} - r_{min}$, and will have a peak at the delay $k\theta_r$ corresponding to the range $d = r_0$, as determined by the partial or complete coincidence between the gating pulse 21 and the echo pulse 22.

If the object distance $d$ were such as to increase the delay by a length of time equal to $\theta_r$ or a multiple thereof, the echo pulses would occupy positions as shown at 122, 122', 122" to define a similar triangular voltage function 123 as indicated in dotted lines in graphs (c) to (f). In this case, however, the phase relation provided in accordance with our invention and described more fully hereinafter reduces the effective magnitude of the gate output to a small fraction of that of output 23, optimally to a value submerged within the noise level N of the system, as indicated at 223 in graph (f). This phase discrimination fails when the additional delay reaches the repetition period $T_R$ of the pattern, yet the corresponding object distance $cT_R/2$ should be large enough to attenuate the last-mentioned echo pulses sufficiently to make the magnitude of the output signal at most equal to that of the first parasitic signal 223 so that these spurious echoes will also be submerged in the noise level.

Figure 8:
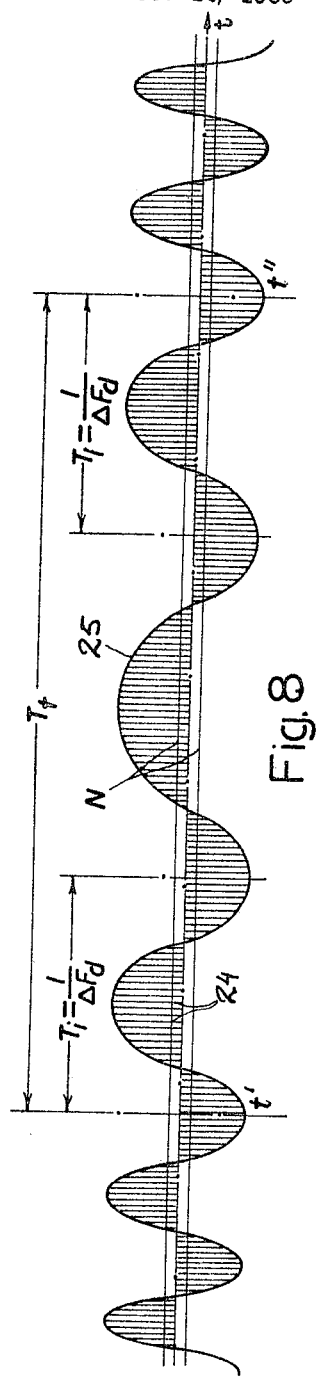

Reference will now be made to FIG. 8 which shows the output of a correlator to which the properly delayed echo pulses 22, to the extent of their coincidence with gating pulses 21, are applied. This output takes the form of a succession of pulses 24 having the same cadence $T_i/n$ and width $\tau$ as the outgoing pulses 20 transmitted by antenna 3. The pulses 24 are the result of a superposition of the received echo pulses and respective reference pulses cophasal with the outgoing pulses 20, the amplitude of the pulses 24 thus varying with the phase of the reflected carrier wave which in turn is a function of the varying object distance as the vehicle M moves past the target O. As already explained, this varying object distance produces a Doppler shift represented by the sinusoidal shape of the envelope 25 of pulse train 24 whose frequency progressively decreases to zero as the missile approaches the perpendicular $L_0$ (FIG. 1) and thereafter progressively increases again. At time $t'$, when the missile traverses the boundary line $L'$, this Doppler frequency has the cut-off value $\Delta F_d$ of a low-pass filter through which the pulse train 24 is passed; the same frequency $\Delta F_d$ is reached at time $t''$ when the missile (having somehow failed to detonate) reaches the boundary line $L''$. The Doppler filter, which cuts off the higher frequencies occurring before time $t'$ and after time $t''$, has an integration period $T_i = 1/\Delta F_d$ which in no case should be greater than the total illumination period $T_t$ and which is here shown to be a fraction of the latter period. The integrating effect of the Doppler filter produces a signal which corresponds to the solid outline of envelope 25 between times $t'$ and $t''$ and which is subsequently detected and noncoherently integrated over the entire period $T_t$. It will be noted from FIG. 8 that the peaks of the envelope 25 rise well above the noise level N. The time constant of the noncoherent integrator or detector should be computed for a distance $d$ having the minimum value $r_{min}$.

Let it be assumed by way of example that the missile M has a velocity $v = 300$ m./sec., that the carrier frequency $f_0 = 15$ gc. ($15 \cdot 10^9$ c.p.s.) and that the pulse width $\tau = 30$ ns. ($30 \cdot 10^{-9}$ second). Given a recurrence period $\theta_r = 150$ ns. and a delay time $k\theta_r = 75$ ns., we can compute the proximal and distal range limits $r_{min}$ and $r_{max}$ as approximately equal to 7 and 16 m., respectively. Assuming a beam width of $\alpha = 0.05$ radian, we can calculate the limiting Doppler frequency $\Delta F_d$ as equal to 1500 c.p.s. whence $T_i$ equals approximately 700 $\mu$s. For the minimum range $d = 700$ cm. we find the illumination period $T_t$ equal to about 2.3 ms., thus slightly more than $3T_i$. The periods $T_i$ and $T_t$ are independent of the angle of inclination $\varphi$ and their ratio $$\frac{T_t}{T_i} = \frac{4df_0\alpha^2}{c}$$

is also independent of the missile velocity $v$.

Figure 9:
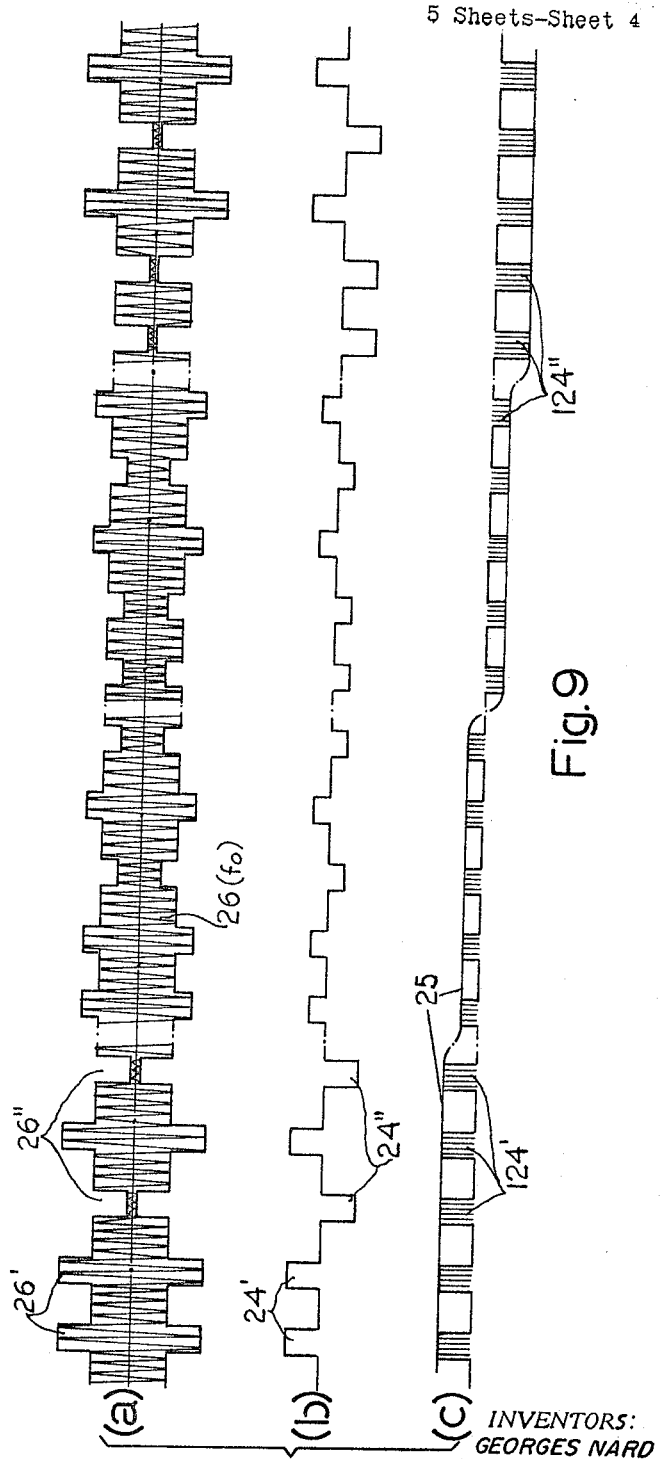

In FIG. 9 we have diagarmmatically illustrated a preferred way of correlating the incoming echo pulses with respective reference pulses which mark the variations in phase of the immediately preceding outgoing pulses. Graph (a) of FIG. 9 shows a continuous carrier wave 26, of frequency $f_0$, which is modulated in amplitude by being superposed upon a train of incoming pulses of substantially constant amplitude and varying phase as shown in FIG. 6. These pulses give rise to peaks 26' and troughs 26'' whose height depends on the phase relationship between the pulses and the carrier, this height being thus subject to a progressive variation in step with the changing distance between the craft and its target. The detected envelope of the stepped wave of graph (a) has been shown in graph (b) of FIG. 9 and consists of positive and negative pulses 24', 24'' having the character of video spikes. These pulses are then selectively reversed, depending on whether the phase shift of the immediately preceding outgoing pulse was 0° or 180°, so as to result in a modified pulse train 124' (positive) and 124'' (negative) as shown in graph (c) of FIG. 9. The pulses 124', 124'' are identical with the spikes 24 of FIG. 8 and, upon integration, yield the low-frequency wave 25.

Figure 10:
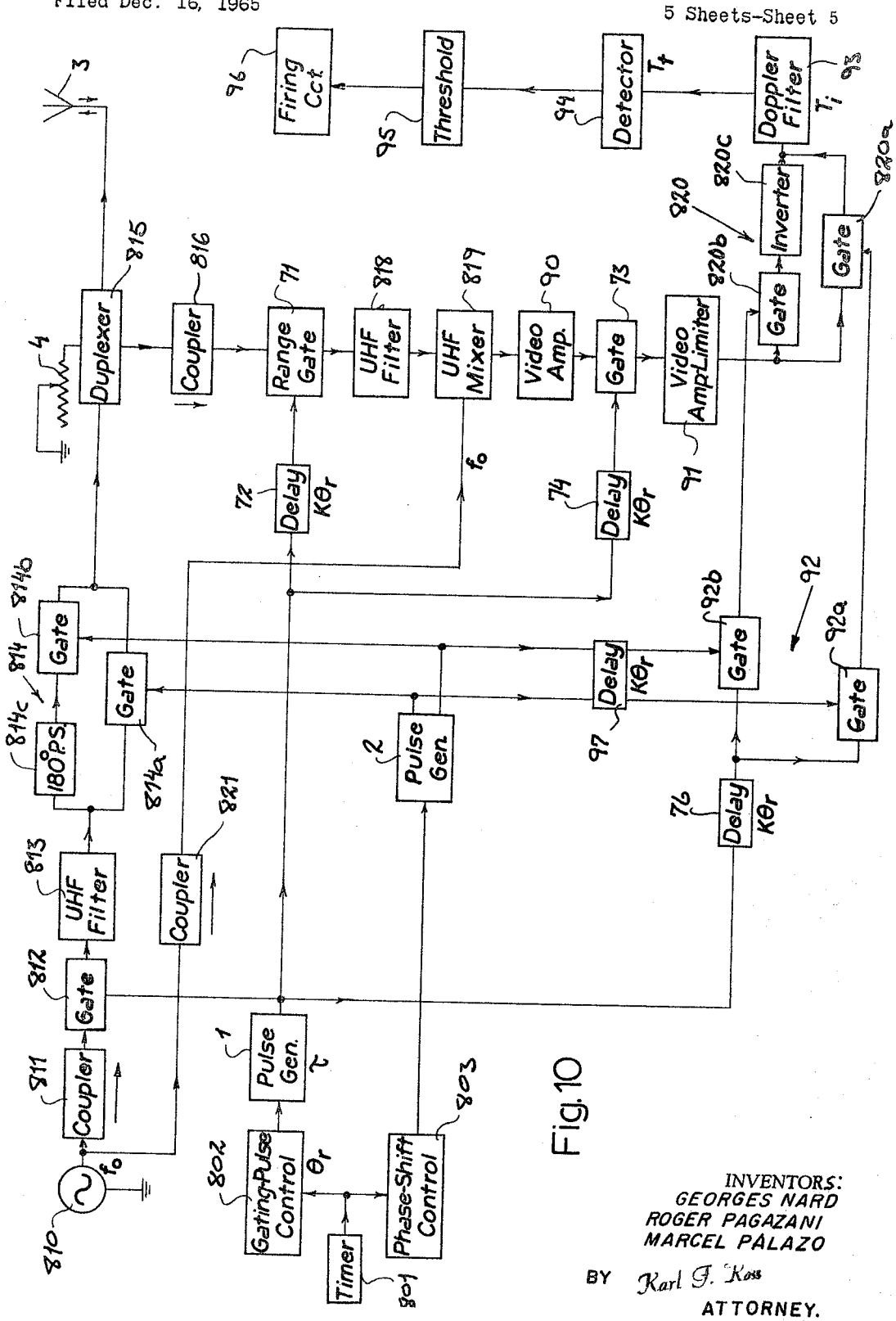
FIG. 10 is a circuit diagram of the triggering system aboard the missile.

Reference will now be made to FIG. 10 for a description of a typical circuit arrangement adapted to perform the operations described above. A high-frequency generator 810 produces a continuous carrier wave of frequency $f_0$ which is applied via a unidirectional or isolating coupler 811 to a controlled rectifier 812 serving as a gating device. Gate 812 is normally blocked and is periodically unblocked, at the recurrence rate $\theta_r$, under the control of a pulse generator 1 having a rectangular output of duration $\tau$. Generator 1 is periodically stepped by a timer 801 via a control circuit 802 which may be adjustable for the purpose of selecting the desired pulse width $\tau$ and/or recurrence period $\theta_r$. The intermittent output of gate 812 is passed through a UHF filter 813 which eliminates undesirable sidebands due to modulation. Next, the pulses are fed to a random phase selector, generally designated 814, which is shown to comprise a pair of gates 814a, 814b connected in parallel, gate 814b being in series with a 180° phase shifter 814c. The gates 814a and 814b are alternately unblocked by respective outputs of a pulse generator 2 which is actuated, in the rhythm of pulse generator 1, by a control circuit 803 also stepped by the timer 801. Circuit 803 may include a memory having the phase pattern of repetition period $T_R$ stored thereon in coded form. Generator 2 may be a multivibrator or flip-flop which unblocks either the gate 814a or the gate 814b, depending on whether or not it receives a control signal from programmer 803.

The output of phase selector 814 is a pulse train 20', 20'' as discussed above with reference to FIG. 6. This pulse train is fed via a duplexer 815 to the common transmit-receive aerial 3 of the missile, the duplexer 815 being provided with an adjustable load resistor 4 designed to provide a proper match for the impedance of antenna 3.

The aforedescribed transmission channel is insulated electrically, as well as by the interleaving of the outgoing and the useful incoming pulses, from a receiving channel which includes an isolating coupler 816 delivering the received echo pulses to a fixed range gate 71 periodically unblocked by a train of gating pulses as shown at 21 in FIG. 7(b). These gating pulses are obtained from the output of generator 1 and are delayed by the aforedescribed range interval $k\theta_r$ in a circuit 72. The pulses passed by the range gate 71 are reshaped in a UHF filter 818 and are then applied to a UHF mixer 819 together with the carrier wave of frequency $f_0$ from generator 1 to produce the amplitude-modulated coherent wave of FIG. 9(a). This coherent wave is fed to a video amplifier 90 delivering an output in the form of spikes 24' and 24'', FIG. 9(b), to another gate 73 which is periodically unblocked by the pulse generator 1, in step with the range gate 71, via a delay circuit 74 introducing the same retardation $k\theta_r$ as the delay circuit 72. The spikes, properly limited in width by the gate 73, now pass through a video amplifier and limiter 91 to a bipolar correlator 820 which comprises a pair of parallel gates 820a, 820b and an inverter 820c in series with the latter gate.

A control circuit 92 comprises a pair of gates 92a, 92b which are alternately unblocked, in response to the output of pulse generator 2, in the rhythm of gates 814a and 814b, respectively, but with a delay $k\theta_r$ provided by an interposed circuit 97. The equispaced pulses from generator 1 are transmitted with a like delay, introduced by a circuit 76, to the gates 92a, 92b where they are selectively passed for the alternative unblocking of gates 820a and 820b, respectively. This action results in the selective reversal of the polarity of the spikes of FIG. 9(b) by the inverter 820c so that the pulse train 124', 124'' of FIG. 9(c) appears in the output of correlator 820.

This decoding of the echoes by means of bipolar video spikes, as distinct from direct phase comparison on the UHF level, affords a better signal-to-noise ratio, the system also being less sensitive to interferences due to vibration and microphonics.

The bipolar video correlator 820, serving as a means for comparing the phases of incoming pulses from limiter 91 with those of immediately preceding outgoing pulses as represented by the incidence of the reference pulses from control circuit 92, works into a Doppler filter 93 which cuts off frequencies above $\Delta F_d$ and, as described in connection with FIG. 8, integrates the composite pulses to produce a signal akin to the envelope 25. A detector 94 receives this signal and noncoherently integrates it with a time constant $T_t$. The integrated signal is then delivered to a threshold device 95 which establishes the minimum level the signal must have in order to actuate a firing circuit 96. Circuit 95 blocks all pulses whose cumulative value rises only insignificantly above the noise level indicated at N in FIGS. 7 and 8.

The various unidirectional couplers and isolators such as elements 811, 816 and 821 may have ferromagnetic of ferrite cores designed to guard against reverse leakage of high-frequency currents. UHF-type rectifiers may be used for the range gate 71 and the other gating devices. The duplexer 815, which may also be of the ferrite or ferromagnetic type, should have an insertion loss of not more than about 1 db in the forward direction and a standing-wave ratio not greater than 1.4. UHF filters 813 and 818 are preferably constituted by coaxial lines. The video amplifier 90 should have a relatively broad pass band, e.g. of several tens of megacycles, in order not to distort unduly the incoming pulses so as to afford the desired accuracy of range selection. Limiter 91 may introduce a slight differentiation of the pulses which, however, would generally not be objectionable. Of course, the various delay circuits should allow for any retardation introduced by the system itself, apart from the design delay of $k\theta_r$.

Minor departures of the axis $R_0$ of the radiated beam B from precise perpendicularity with reference to the trajectory P of the missile (i.e. deviations of the angle $\Psi_0$ from 90°) may be tolerated and will generally not render the system inoperative.

Naturally, the arrangements specifically described and illustrated may be modified without departing from the spirit and scope of our invention as defined in the appended claims.

We claim:

1. An airborne triggering system responsive to echoes of high-frequency electromagnetic waves reflected from a target, comprising aboard a vehicle:
  a source of equispaced pulses constituting bursts of a high-frequency carrier oscillation of constant frequency, said carrier oscillation varying randomly in phase relative to an unmodulated reference wave of like frequency throughout a train of said pulses whose duration is large compared with the recurrence period of said pulses;
  transmitting means coupled to said source for consecutively sending out said pulses over an outgoing radar beam centered on a direction substantially perpendicular to the flight path of said vehicle;
  receiving means responsive to echoes of said pulses reflected from extraneous objects;
  a delay circuit connected to said source;
  range-gate means coupled to said receiving means and controlled via said delay circuit by said source for blocking incoming echo pulses at all times except for a brief interval occurring a predetermined time after the transmission of each outgoing pulse;
  correlating means coupled to said source and to said range-gate means for comparing the phase of any incoming echo pulse, passed by said range-gate means, with that of an immediately preceding outgoing pulse and for deriving therefrom an output of a magnitude dependent upon the degree of match between the phases of the two pulses thus compared;
  and a load circuit connected to said correlating means for receiving said output therefrom, said load circuit including threshold means for producing a triggering signal upon said output exceeding a predetermined magnitude.

2. A system as defined in claim 1 wherein said load circuit includes integrating means having a period of integration many times greater than said recurrence period.

3. A system as defined in claim 2 wherein said correlating means includes decoding means for producing a low-frequency wave due to Doppler shift from a superposition of incoming echo pulses upon said carrier oscillation, said integrating means comprising a low-pass filter for suppressing waves of greater than a limiting frequency due to a Doppler shift generated by a radial component of the relative motion between the vehicle and a reflecting object upon the latter being illuminated by a boundary ray of said radar beam including a predetermined angle with said substantially perpendicular direction.

4. A system as defined in claim 3 wherein the delay of said delay circuit and the effective width of said beam in a plane including the flight path, as limited by said predetermined angle on both sides of said substantially perpendicular direction, are chosen to provide an illumination period of said target by said beam exceeding said integration period, said integrating means further including storage means with a time constant substantially equal to said illuminating period inserted between said low-pass filter and said threshold means for noncoherently integrating the coherently integrated output of said low-pass filter throughout said illumination period.

5. A system as defined in claim 3 wherein said source comprises phase-control means for producing a random phase pattern with a repetition period $T_R = m\theta_r$ where $m \gg 1$ and $\theta_r$ is said recurrence period, the integration period $T_i = n\theta_r$ of said low-pass filter being substantially greater than $T_R$.

6. A system as defined in claim 5 wherein the number $p$ of phase patterns within an integration interval determined by said integration period $T_i$, satisfying the relationship $n = pm$, is greater than 2 but less than $\sqrt{n}$.

7. A system as defined in claim 6 wherein $n$ is on the order of $10^3$.

8. A system as defined in claim 3 wherein said source comprises a continuous-wave generator, timer means for periodically pulsing said generator to produce said equispaced pulses, and phase-shifting means controlled by said timer means for reversing the phase of the output of said generator during certain pulses while leaving its phase unchanged during the remaining pulses.

9. A system as defined in claim 8 wherein said decoding means includes mixer means for superposing a continuous high-frequency oscillation from the output of said generator upon said incoming echo pulses whereby an amplitude-modulated carrier wave is produced, detector means for deriving bipolar spikes from the envelope of said carrier wave, and selective gating means for said spikes responsive to the output of said phase-shifting means.

10. A system as defined in claim 1 wherein said transmitting means and said receiving means include common antenna means and duplexing means connecting said antenna means on the one hand to said source and on the other hand to said range-gate means.

No references cited.

RODNEY D. BENNETT, *Primary Examiner.*

CHESTER L. JUSTUS, *Examiner.*

T. H. TUBBESING, *Assistant Examiner.*